United States Patent
Miyajima et al.

(10) Patent No.: US 7,602,767 B2
(45) Date of Patent: Oct. 13, 2009

(54) IP COMMUNICATION METHOD, IP TERMINAL APPARATUS, ENUM SERVER AND IP COMMUNICATION SYSTEM

(75) Inventors: Akira Miyajima, Yokohama (JP); Kazuto Kobayashi, Kawasaki (JP)

(73) Assignee: Panasonic Corporation, Osaka (JP)

( * ) Notice: Subject to any disclaimer, the term of this patent is extended or adjusted under 35 U.S.C. 154(b) by 802 days.

(21) Appl. No.: 11/235,154

(22) Filed: Sep. 27, 2005

(65) Prior Publication Data
US 2006/0077983 A1    Apr. 13, 2006

(30) Foreign Application Priority Data
Oct. 8, 2004   (JP)   ............... 2004-296839

(51) Int. Cl.
H04L 12/56    (2006.01)
G06F 15/16    (2006.01)
G06F 17/30    (2006.01)

(52) U.S. Cl. .............. 370/352; 370/395.52; 707/3; 709/203

(58) Field of Classification Search .......... 370/352, 370/395.52; 707/3; 709/203
See application file for complete search history.

(56) References Cited

U.S. PATENT DOCUMENTS

| | | | |
|---|---|---|---|
| 6,687,341 B1 * | 2/2004 | Koch et al. ............. | 379/88.17 |
| 6,700,884 B2 * | 3/2004 | Emerson, III .............. | 370/352 |
| 6,788,672 B1 * | 9/2004 | Buyukkoc et al. ........... | 370/352 |
| 6,928,070 B2 * | 8/2005 | Emerson, III ............. | 370/352 |
| 6,968,050 B1 * | 11/2005 | Pershan et al. ............. | 379/196 |
| 7,027,582 B2 * | 4/2006 | Khello et al. ........ | 379/220.01 |
| 7,343,168 B2 * | 3/2008 | Valloppillil ................ | 455/466 |
| 7,359,368 B1 * | 4/2008 | Pearce ...................... | 370/352 |
| 7,474,665 B2 * | 1/2009 | Cho ........................... | 370/401 |
| 2002/0073335 A1 | 6/2002 | Shuster | |
| 2004/0092273 A1 * | 5/2004 | Valloppillil ................. | 455/466 |
| 2004/0137921 A1 * | 7/2004 | Valloppillil et al. ......... | 455/466 |
| 2005/0182781 A1 * | 8/2005 | Bouvet ....................... | 707/102 |

FOREIGN PATENT DOCUMENTS

| | | |
|---|---|---|
| JP | 8-130594 | 5/1996 |
| JP | 2004-248086 | 9/2004 |

OTHER PUBLICATIONS

English Language Abstract of JP 2004-248086.
English Language Abstract of JP 8-130594.
ENUM Trial Japan, "ENUM Trial Japan First Report," May 2004, together with an English language translation of the same.

(Continued)

Primary Examiner—Alpus H Hsu
(74) Attorney, Agent, or Firm—Greenblum & Bernstein P.L.C.

(57) ABSTRACT

Upon receiving, from a source IP terminal, a DNS packet that includes destination NAPTR query data with a keyword, an ENUM server compares the keyword with a keyword of a destination IP terminal stored in a keyword database. When the keywords are identical, the ENUM server generates a reply packet that includes NAPTR records, excluding the keyword, of the destination IP terminal registered in the NAPTR database. When the keywords are not identical, on the other hand, the ENUM server generates a reply packet indicating "No corresponding data." Then, the ENUM server returns the generated reply packet to the source IP terminal.

8 Claims, 12 Drawing Sheets

OTHER PUBLICATIONS

Sinnreich et al., "Mastering TCP/IP SIP, Chapter 14 (DVS and ENUM)" together with an English language translation of the same.

U.S. Appl. No. 11/150,119 to Kobayashi et al., which was filed on Jun. 13, 2005.

U.S. Appl. No. 11/235,275 to Miyajima, which was filed on Sep. 27, 2005.

U.S. Appl. No. 11/235,217 to Miyajima et al., which was filed on Sep. 27, 2005.

U.S. Appl. No. 11/235,273 to Miyajima, which was filed on Sep. 27, 2005.

U.S. Appl. No. 11/235,156 to Miyajima et al., which was filed on Sep. 27, 2005.

U.S. Appl. No. 11/249,715 to Kobayashi et al., which was filed on Oct. 14, 2005.

Houston, "Implications of ENUM Presentation," (Jul. 2003), XP002363539, retrieved from the Internet: <URL: http://www.cisl.ucar.edu/nets/projects/Westnet/prev-mtg/200307.meeting/2003.Presentations/enum.ppt>.

TMDENTON.COM: "Privacy issues in ENUM," tmdenton.com (Oct. 29, 2003), XP002363540, Retrieved from the Internet: <URL. http://www.tmdenton.com/pub/privacy_ENUM.pdf>.

Shockey et al., "Privacy and Security Considerdation in ENUM," IETF Standard-Working-Draft, IETF, Ch, vol. Enum, No. 1 (Jul. 2003), XP015001847.

* cited by examiner

Fig.4

KEYWORD database

| Destination | Keyword | Other Keyword |
|---|---|---|
| 05012345678 | ABC | mail@jp.dddd.com |
| 05033334444 | DEF | — |
| 05055556666 | — | mail@jp.abcd.com |

Fig.5

NAPTR database

| ENUM domain name | | Order | Preference | Flags | Service | URI scheme |
|---|---|---|---|---|---|---|
| 8.7.6.5.4.3.2.1.5.1.8.e164.arpa | IN NAPTR | 999 | 99 | "u" | "E2U+KEYWORD" | "!^.*$!KEYWORDdatabase!" "KeyWord" |
| | IN NAPTR | 102 | 10 | "u" | "E2U+sip" | "!^.*$!mailto:mail@jp.dddd.com!" |
| | IN NAPTR | 104 | 10 | "u" | "E2U+ifax" | "!^.*$!mailto:ifax@jp.dddd.com!" |

NAPTR resource records

Fig.7

| DNS packet (requests NAPTR acquisition) | Keyword |

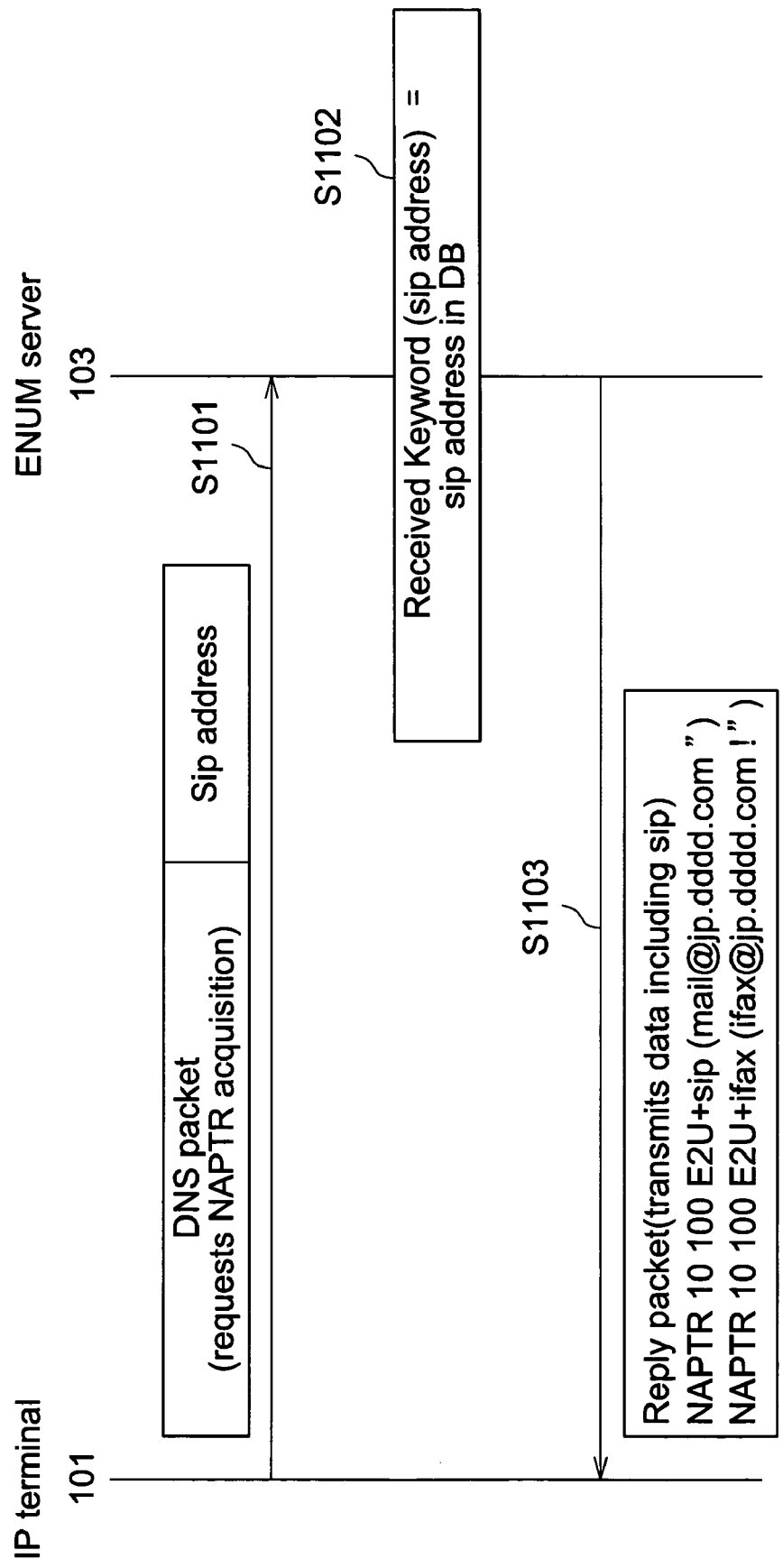

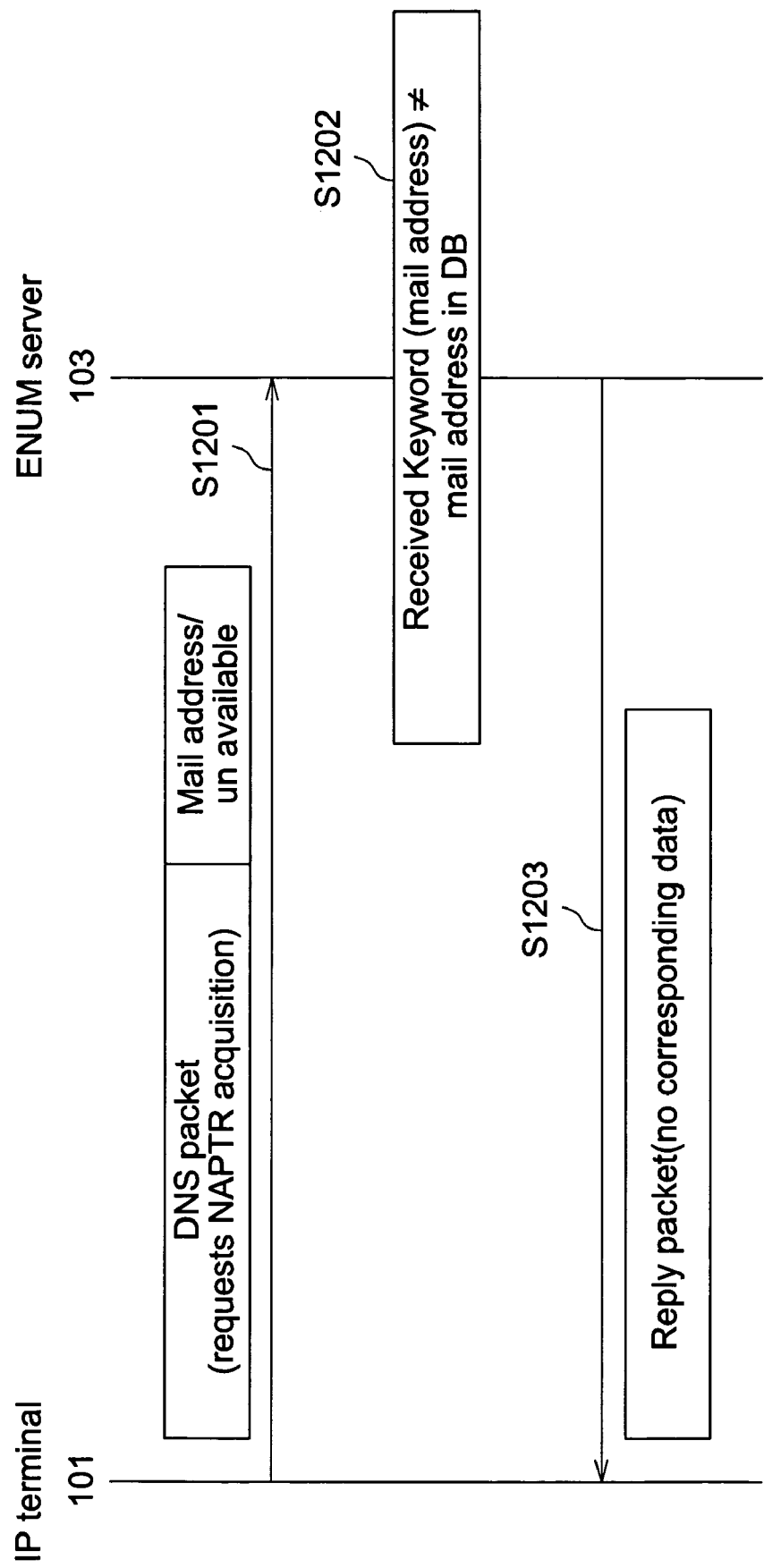

IP COMMUNICATION METHOD, IP TERMINAL APPARATUS, ENUM SERVER AND IP COMMUNICATION SYSTEM

BACKGROUND OF THE INVENTION

1. Field of the Invention

The present invention relates to an IP communication method, an IP terminal apparatus, an ENUM server and an IP communication system, especially relating to the IP communication method that includes the IP terminal apparatus and the ENUM server, the IP terminal apparatus, the ENUM server and the IP communication system.

2. Description of Related Art

With rapid spread of the Internet these days, an IP telephone system draws attention since the system allows low-rate calls to a telephone apparatus in a remote location and free calls between IP telephone apparatuses of subscribers. A protocol "ENUM (Telephone Number Mapping)," provided in RFC2916 (Publication 1) that the IETF (Internet Engineering Task Force) and the ITU-T (International Telecommunication Union—Telecommunication Standardization Sector) have been developing, is used to connect services and resources on the Internet with telephone numbers.

Based on a DNS (Domain Name System) architecture, the "ENUM" protocol retrieves IP addresses or URI's (Uniform Resource Identifier) using telephone numbers converted to meet the E.164 system defined by the ITU-T.

[Publication 1] The first report of ENUM Trial Japan issued by ENUM Trial Japan in May, 2004

However, an ENUM server that connects to an IP communication system is an open system being accessible via DNS, thus vulnerable to security problems, including a possibility that a third party may capture a packet communicated between an IP terminal apparatus and the ENUM server.

NAPTR (the Naming Authority Pointer) resource records registered on the ENUM server are configured based on a telephone number. Therefore, when a plurality of telephone numbers are used to inquire NAPTR resource records on the ENUM server, it is possible to gather the NAPTR resource records corresponding to the plurality of telephone numbers. Then, the gathered NAPTR resource records could be used to gather user information set up on IP terminal apparatuses, posing a problem that user information could be leaked to a third party.

SUMMARY OF THE INVENTION

The present invention is provided to address the above-described problems. The purpose of the present invention is to provide an IP communication method, an IP terminal apparatus, an ENUM server and an IP communication system that prevent leak of NAPTR resource records to a third party and an unauthorized access by a third party when a source IP terminal apparatus accesses the ENUM server to obtain NAPTR resource records of a destination IP terminal apparatus.

The present invention relates to an IP communication method in an IP communication system that includes an IP terminal apparatus connected via an IP network and an ENUM server. The ENUM server has a database to store registered NAPTR resource records corresponding to telephone number information of an IP terminal apparatus and returns the NAPTR resource records in response to a query from an IP terminal apparatus. The IP terminal apparatus generates a query packet by adding an input keyword to a packet for inquiring NAPTR resource records of a destination IP terminal apparatus; transmits the generated query packet to the ENUM server; and, when the keyword is identical to a keyword on the ENUM server after the query packet is transmitted, receives a reply packet that includes the NAPTR resource records of the destination IP terminal apparatus. The ENUM server stores in memory the keyword corresponding to the telephone number information of the IP terminal apparatus; receives from the IP terminal apparatus the query packet regarding the destination IP terminal apparatus with the keyword attached; compares the keyword added to the received query packet with the keyword of the destination IP terminal apparatus stored in the memory; when the keywords are identical, retrieves corresponding NAPTR resource records from the database and generates a reply packet that includes the NAPTR resource records; and returns the generated reply packet to the IP terminal apparatus from which the NAPTR query packet is received regarding the destination IP terminal apparatus.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 4 illustrates an example of a keyword database in the ENUM server according to the first embodiment;

FIG. 5 illustrates an example of a NAPTR database in the ENUM server according to the first embodiment;

FIG. 7 illustrates an example of a DNS packet generated in the IP terminal apparatus according to the first embodiment;

FIG. 11 illustrates a sequence diagram describing an operation when a SIP address transmitted from an IP terminal apparatus to an ENUM server is identical according to a second embodiment; and FIG. 12 illustrates a sequence diagram describing an operation when a SIP address transmitted from the IP terminal apparatus to the ENUM server is not identical according to the second embodiment.

DETAILED DESCRIPTION OF PREFERRED EMBODIMENTS

The embodiments of the present invention are explained in the following, in reference to the above-described drawings.

First Embodiment

Figure 1:
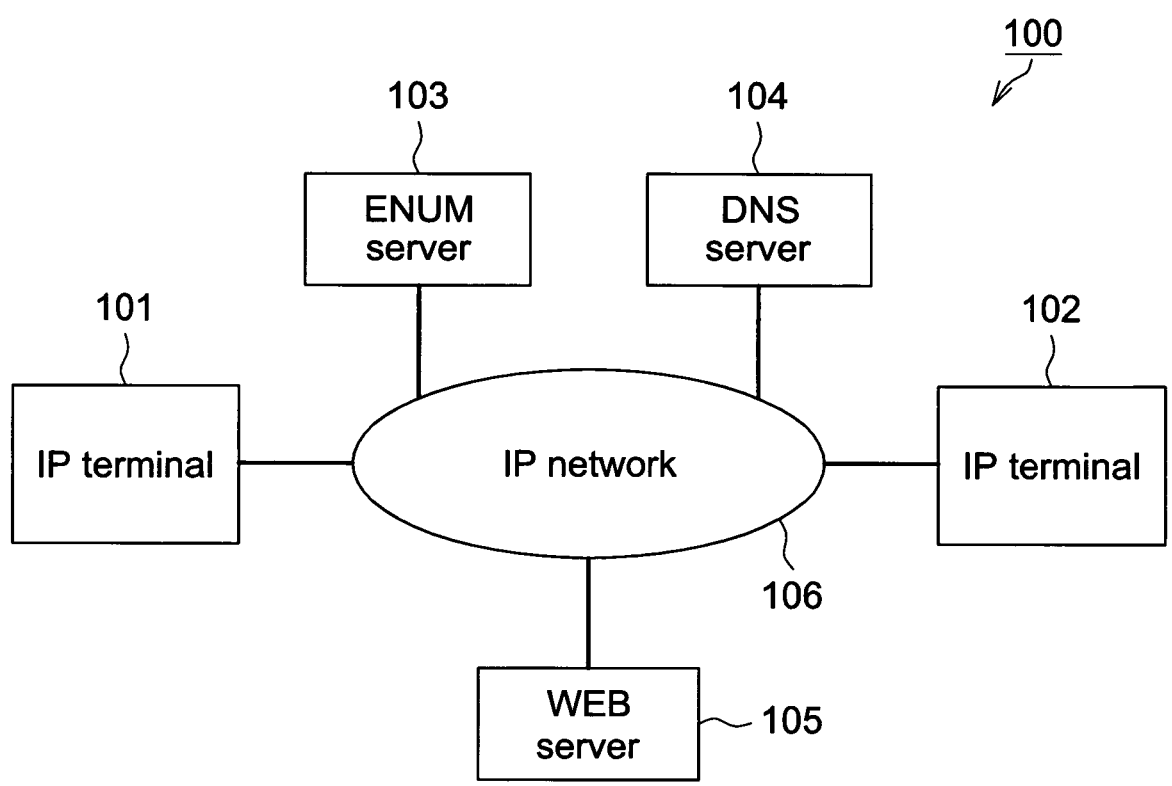
FIG. 1 illustrates a block diagram describing an IP communication system configuration according to a first embodiment of the present invention.

FIG. 1 illustrates an overall configuration of an IP communication system according to the first embodiment. In IP communication system 100, IP terminal apparatuses (hereinafter referred to as IP terminals) 101 and 102, ENUM server 103, DNS server 104 and Web server 105 interconnect via IP network 106 as shown in FIG. 1.

IP terminal 101 (102) is a multifunction apparatus that provides a plurality of communication functions, including IP telephone, facsimile and e-mail, and other functions, including printing, scanning and the like. The IP telephone function of IP terminal 101 (102) allows a voice call between IP telephones via IP network 106. The facsimile and e-mail functions allow facsimile and e-mail communications with another multifunction apparatus via IP network 106.

ENUM (Telephone Number Mapping) server 103 has a database to register NAPTR (The Naming Authority Pointer) resource records (hereinafter referred to as NAPTR records). In response to a query from IP terminal 101 (102), ENUM server 103 returns, to IP terminal 101 (102), the NAPTR records registered in the database.

DNS (Domain Name System) server 104 has a database to register a URI (Uniform Resource Identifier) specified in the NAPTR records and an IP address corresponding to the URI. In response to a query from IP terminal 101 (102), DNS server 104 returns, to IP terminal 101 (102), the IP address registered in the database.

Web server 105 stores information, including HTML (Hyper Text Markup Language) text and image, and transmits the information to IP terminal 101 (102) in response to a request from client software, including a Web Browser and the like.

Figure 2:
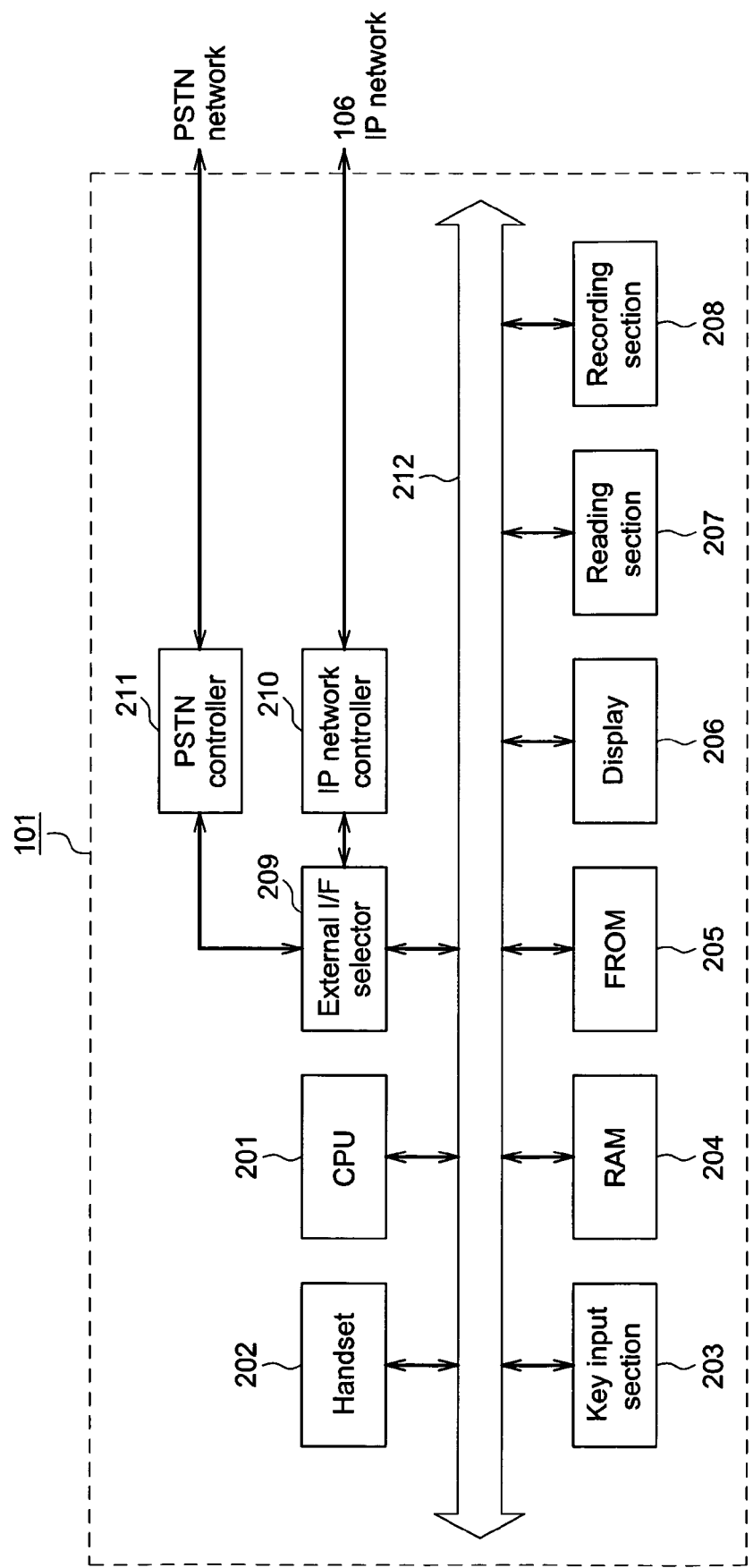
FIG. 2 illustrates a block diagram describing an IP terminal apparatus configuration according to the first embodiment.

FIG. 2 is a block diagram that illustrates a configuration of IP terminal 101 according to the first embodiment. As shown in FIG. 2, IP terminal 101 has bus 212 that interconnects CPU 201, handset 202, key input section 203, RAM 204, FROM 205, display 206, reading section 207, recording section 208 and external I/F selector 209 to which IP network controller 210 and PSTN controller 211 are connected. IP terminal 102 also has the same configuration as IP terminal 101.

CPU (Central Processing Unit) 201 controls all operations required for IP telephone, facsimile communication and e-mail communication with another IP terminal via IP network 106, based on an IP telephone control program, a facsimile communication control program and an e-mail control program stored in FROM 205. Thus, CPU 201 executes call control with a destination IP terminal, following a call control protocol as represented by SIP (Session Initiation Protocol) and H.323. CPU 201 also provides predetermined instructions to display 206, reading section 207, recording section 208 and external I/F selector 209.

Furthermore, when a user of IP terminal 101 performs dial-input of a telephone number of destination IP terminal 102, CPU 201 generates destination NAPTR query data including the telephone number of IP terminal 102. The user also inputs a keyword on IP terminal 101, the keyword being previously notified from a user of IP terminal 102 to the user of IP terminal 101 via another communication method (e.g., telephone). Then, CPU 201 generates a DNS packet (query packet) including the destination NAPTR query data with the keyword attached and transmits the DNS packet to ENUM server 103.

After transmitting the DNS packet, CPU 201 receives, from ENUM server 103, one of a reply packet including the NAPTR records of destination IP terminal 102 and a reply packet indicating that no corresponding NAPTR record is available, based on the result of comparing the keyword included in the DNS packet with a keyword stored on ENUM server 103. CPU 201 works as a query packet generator.

Handset 202 outputs to CPU 201 one of an off-hook signal and an on-hook signal, depending on one of user's on-hook and off-hook operations. Handset 202 has a microphone and a speaker. Upon communicating with the destination IP terminal, the microphone converts a transmitting voice into a transmitting audio signal and outputs to CPU 201; the speaker outputs, as a receiving voice, the receiving audio signal input from CPU 201.

Key input section 203, which includes a numeric keypad, function keys and so forth, is used for dialing operation, an operation for inputting a keyword and other operations by a user to call a destination IP terminal.

RAM (Random Access Memory) 204 functions as a work memory when CPU 201 executes a program. FROM (Flash Read Only Memory) 205 stores the IP telephone control program, the facsimile communication control program, the e-mail control program and the like.

Display 206, having a liquid crystal panel and other parts, indicates the current status of IP terminal 101. Reading section 207 scans an image of a document set on a document reader (not shown in the figure), converts the scanned image into digital image data and transmits to CPU 201. Recording section 208 develops the digital image data input from CPU 201 in a recordable format and records onto a recording sheet.

External I/F selector 209 appropriately selects one of IP network controller 210 and PSTN controller 211 according to an instruction for selecting a communication function input from CPU 201, based on a communication function selected by a user (IP telephone, facsimile or e-mail). External I/F selector 209 outputs transmitting data input from CPU 201 to one of IP network controller 210 and PSTN controller 211 and outputs to CPU 201 a receiving signal input from one of IP network controller 210 and PSTN controller 211.

IP network controller 210 provides an interface function with IP network 106, to which IP terminal 101 is connected; an IP telephone control function, where CPU 201 controls IP telephone with a destination IP terminal via IP network 106; a facsimile control function, where CPU 201 controls facsimile communication with the destination IP terminal via IP network 106; and an access function, where CPU 201 controls access to Web server 105 via IP network 106.

In facsimile communication, IP network controller 210 transmits digital image data input from CPU 201 to the destination IP terminal via IP network 106. IP network controller 210 receives digital image data from the destination IP terminal via IP network 106 and transmits the data to CPU 201.

When IP terminal 101 places a call to a destination IP terminal by using key input section 203, IP network controller 210, controlled by CPU 201, transmits the above DNS packet to ENUM server 103 and receives a reply packet from ENUM server 103. IP network controller 210 works as a transmitter and a receiver.

PSTN (Public Switched Telephone Networks) controller 211 provides an interface function with PSTN (not shown in the figure) to which IP terminal 101 is connected. PSTN controller 211 also provides a communication control function with other PSTN communication terminals, the communication control function being controlled by CPU 201.

Figure 3:
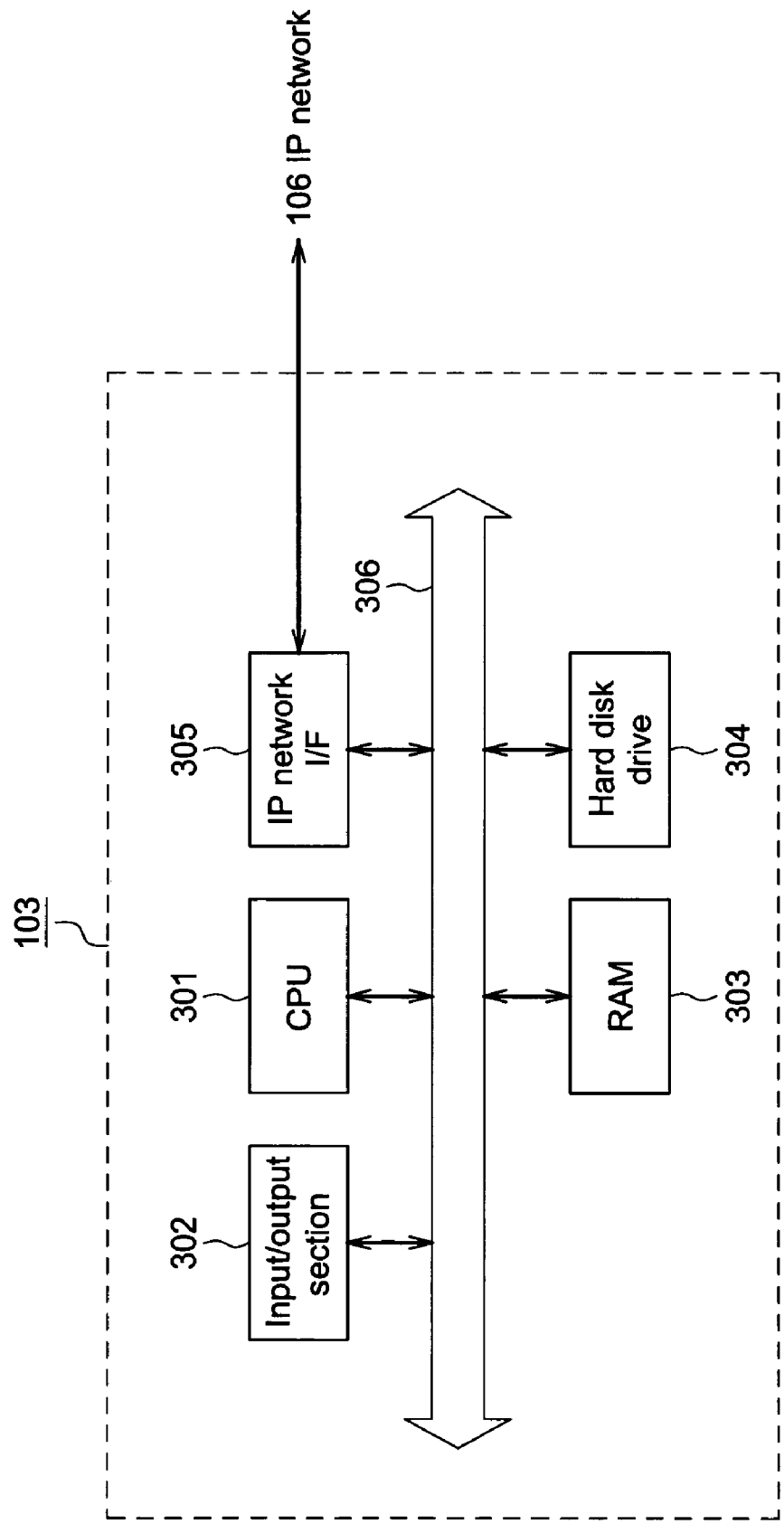
FIG. 3 illustrates a block diagram describing an ENUM server configuration according to the first embodiment.

FIG. 3 is a block diagram that illustrates a configuration of ENUM server 103 according to the first embodiment. As shown in FIG. 3, ENUM server 103 has bus 306 that interconnects CPU 301, input/output section 302, RAM 303, hard disk drive 304 and IP network I/F 305.

CPU 301 controls entire ENUM server 103 based on a control program stored on hard disk drive 304. Furthermore, CPU 301 receives, from IP terminal 101, a DNS packet (query packet) that includes destination NAPTR query data with a keyword attached and compares the keyword included in the DNS packet with a keyword of destination IP terminal 102 stored in a keyword database, which is discussed later.

When the keywords are identical based on the result of the comparison above, CPU 301 generates a reply packet that contains the NAPTR records of destination IP terminal 102 stored in the after-mentioned NAPTR database, excluding the keyword. When the keywords are not identical, CPU 301 generates a reply packet indicating that no corresponding data is available. CPU 301 then transmits the generated reply packet to IP terminal 101 from which the query packet is received. CPU 301 works as a comparison unit and a reply packet generator.

Input/output section 302 has an input device, including a keyboard and the like, to maintain ENUM server 103, and an output device, including a display, to show maintenance information. RAM 303 serves as a work memory when CPU 301 executes a program.

Hard disk drive 304 includes a NAPTR database to store control program and other programs that CPU 301 executes and to register the NAPTR records above. Hard disk drive 304 also includes a keyword database to store the keywords above.

FIG. 4 is a chart that illustrates an example of the keyword database according to the first embodiment. The chart shows that the keyword database has the following corresponding fields: a "Destination" field to store telephone number information of an IP terminal, a "KeyWord" field to store a keyword and an "Other KeyWord" field to store other keyword, including an e-mail address. This example shows that a telephone number "05012345678" of IP terminal 102, a keyword "ABC" and an e-mail address "mail@jp.dddd.com" as other keyword are stored, corresponding to one another. Likewise, a telephone number "05033334444" for another IP terminal and a keyword "DEF" are stored, corresponding each other. In the same manner, an IP terminal with a telephone number "05055556666" is stored corresponding to an e-mail address "mail@jp.abcd.com" as other keyword.

FIG. 5 is a chart that illustrates an example of the NAPTR database according to the first embodiment. The chart shows an example that NAPTR records are stored corresponding to a domain name "8.7.6.5.4.3.2.1.5.1.8.e164.arpa," the domain name being obtained from the IP terminal 102 telephone number "05012345678."

IP network I/F 305 is an interface with IP network 106 to which ENUM server 103 is connected. IP network I/F 305, controlled by CPU 301, receives the above DNS packet and transmits the above reply packet to IP terminal 101 from which the query packet is received. IP network I/F 305 works as a transmitter and a receiver.

Next, a transmission operation of a DNS packet in IP communication system 100 of FIG. 1 is discussed with reference to a flowchart in FIG. 6. In IP communication system 100, IP terminal 101 transmits a DNS packet to ENUM server 103 for inquiring NAPTR records of destination IP terminal 102.

Figure 6:
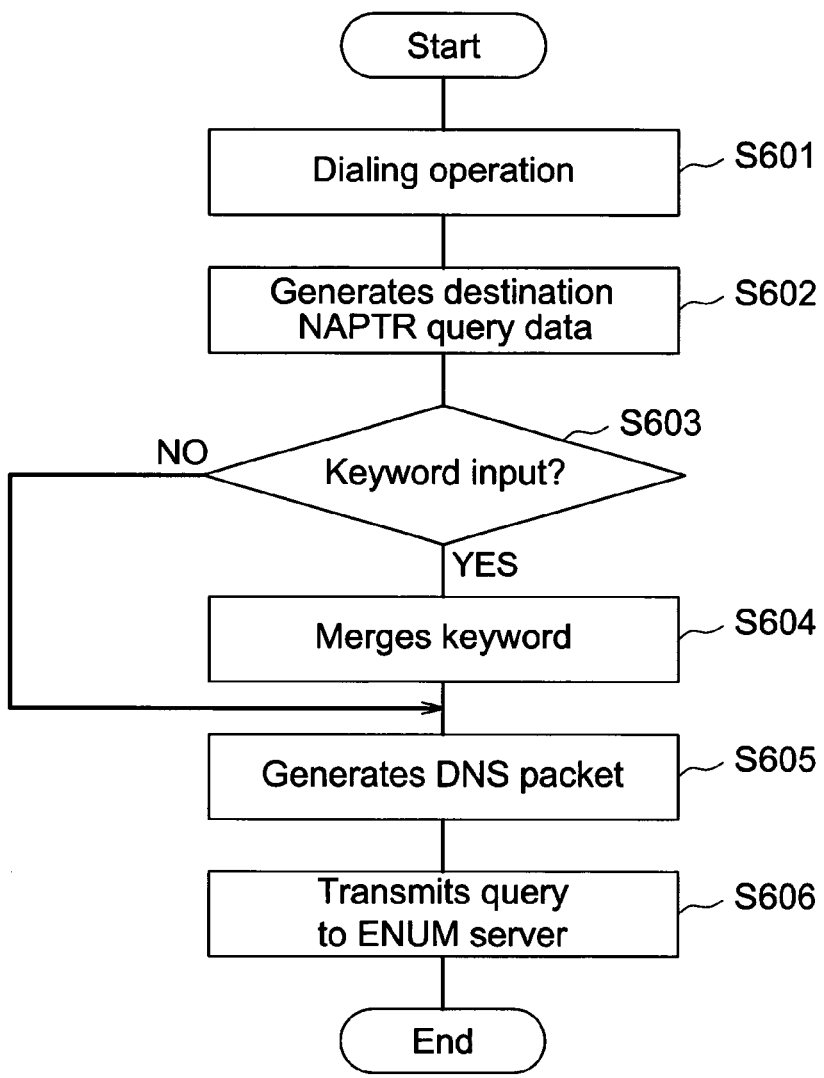
FIG. 6 illustrates a flowchart describing DNS packet transmission from the IP terminal apparatus according to the first embodiment.

As a premise to discuss the operation in FIG. 6, it is assumed that an IP terminal 101 user is informed, by an IP terminal 102 user via another method of communication (e.g., telephone), of a keyword that allows access to IP terminal 102. The keyword is intended to prevent a third party from improperly acquiring NAPTR records of one of IP terminal 101 and IP terminal 102. The keyword is pre-registered on ENUM server 103 under the agreement of the users of IP terminals 101 and 102.

When the IP terminal 101 user operates key input section 203 and dials a telephone number "05012345678" of IP terminal 102 (step S601), CPU 201 generates destination NAPTR query data that include the telephone number "05012345678" input from key input section 203 (step S602).

Then CPU 201 determines whether a keyword is input from key input section 203 (step S603). When CPU 201 confirms that a keyword "ABC" of IP terminal 102 is input (step S603: Yes), CPU 201 merges the keyword "ABC" into the destination NAPTR query data (step S604). When CPU 201 confirms that the keyword "ABC" of IP terminal 102 is not input (step S603: No), CPU 201 proceeds to step S605.

Then CPU 201 generates a DNS packet (query packet), based on one of the destination NAPTR query data merged with the keyword "ABC" and the destination NAPTR query data alone (step S605). FIG. 7 shows an example of the DNS packet.

Then CPU 201 transmits the generated DNS packet from IP network controller 210 to ENUM server 103 via external I/F selector 209 (step S606) and completes the process.

Next, an operation of ENUM server 103 in IP communication system 100 of FIG. 1 is discussed with reference to a flowchart in FIG. 8. ENUM server 103 receives the DNS packet transmitted from IP terminal 101 and returns a reply packet.

Figure 8:
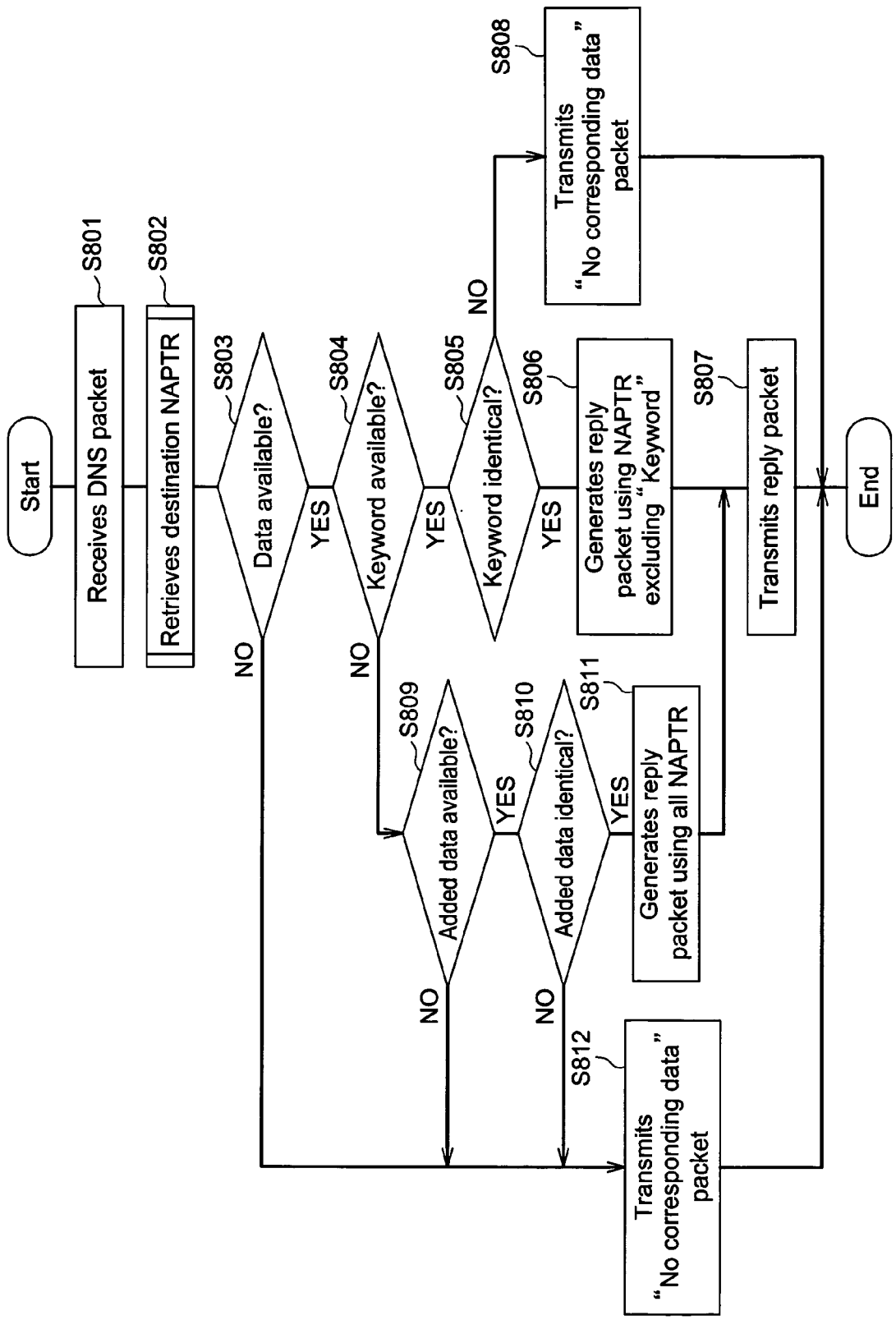
FIG. 8 illustrates a flowchart describing reply packet generation on the ENUM server according to the first embodiment.

As a premise to discuss the operation in FIG. 8, it is assumed that hard disk drive 304 in ENUM server 103 has the keyword database shown in FIG. 4 and the NAPTR database shown in FIG. 5.

When ENUM server 103 receives the DNS packet transmitted from IP terminal 101 through IP network I/F 305 via IP network 106 (step S801), CPU 301 retrieves, from the NAPTR database, the NAPTR records of destination IP terminal 102, based on the destination NAPTR query data included in the DNS packet (step S802).

Then CPU 301 determines whether the received DNS packet includes added data (step S803). When CPU 301 confirms that the DNS packet includes added data (step S803: Yes), CPU 301 determines whether the added data is the keyword "ABC" (step S804).

When the added data is determined to be the keyword "ABC" (step S804: Yes), CPU 301 compares the received keyword "ABC" with a keyword "ABC" of IP terminal 102 registered in the "KeyWord" field of the keyword database and determines whether the keywords are identical (step S805).

When the keywords are determined to be identical (step S805: Yes), CPU 301 generates a reply packet using the NAPTR records of destination IP terminal 102 retrieved in step S802 (refer to FIG. 5) (step S806), excluding "KeyWord," and returns the generated reply packet to IP terminal 101 through IP network I/F 305 via IP network 106 (step S807).

When the keywords are determined not to be identical in step S805 (step S805: No), CPU 301 proceeds to step S808, generates a reply packet including "No corresponding data," returns the rely packet to IP terminal 101 and then completes the process.

When the added data is determined not to be the keyword (KeyWord) in step S804 (step S804: No), CPU 301 proceeds to step S809 and determines whether the added data is other type of data. The other type of data here includes an e-mail address and other data registered in the "Other KeyWord" field of the keyword database in FIG. 4.

When the added data is determined to be the other type of data (e-mail address) (step S809: Yes), CPU 301 compares the added data (e-mail address) with an e-mail address registered in the "Other KeyWord" field of the keyword database and determines whether the data are identical (step S810).

When the data (e-mail addresses) are determined to be identical (step S810: Yes), CPU 301 generates a reply packet using all NAPTR records of the destination IP terminal retrieved in step S802 (step S811), returns the generated reply packet to IP terminal 101 through IP network I/F 305 via IP network 106 (step S807) and then completes the process.

When no data is added to the DNS packet in step S803 (step S803: No), CPU 301 proceeds to step S812, generates a reply packet including "No corresponding data," returns the reply packet to IP terminal 101 and then completes the process. When the added data does not correspond to the other type of data in step S809 (step S809: No), CPU 301 proceeds to step S812, generates a reply packet including "No corresponding data," returns the reply packet to IP terminal 101 and then completes the process. When the other data (e-mail addresses) are not identical in step S810 (step S810: No), CPU 301 proceeds to step S812, generates a reply packet including "No corresponding data," returns the reply packet to IP terminal 101 and then completes the process.

Figure 9:
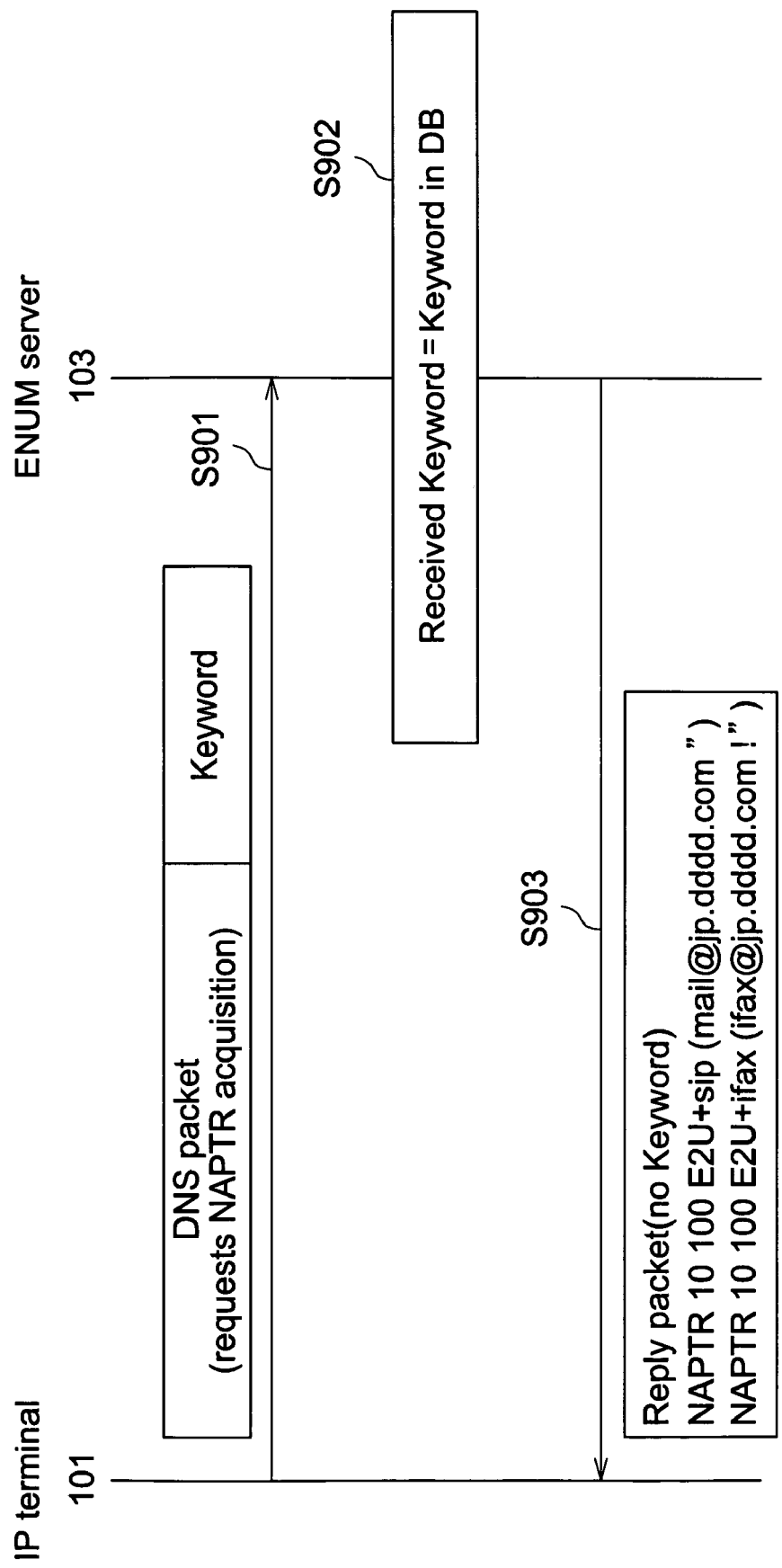
FIG. 9 illustrates a sequence diagram describing an operation when a keyword transmitted from the IP terminal apparatus to the ENUM server is identical according to the first embodiment.
Figure 10:
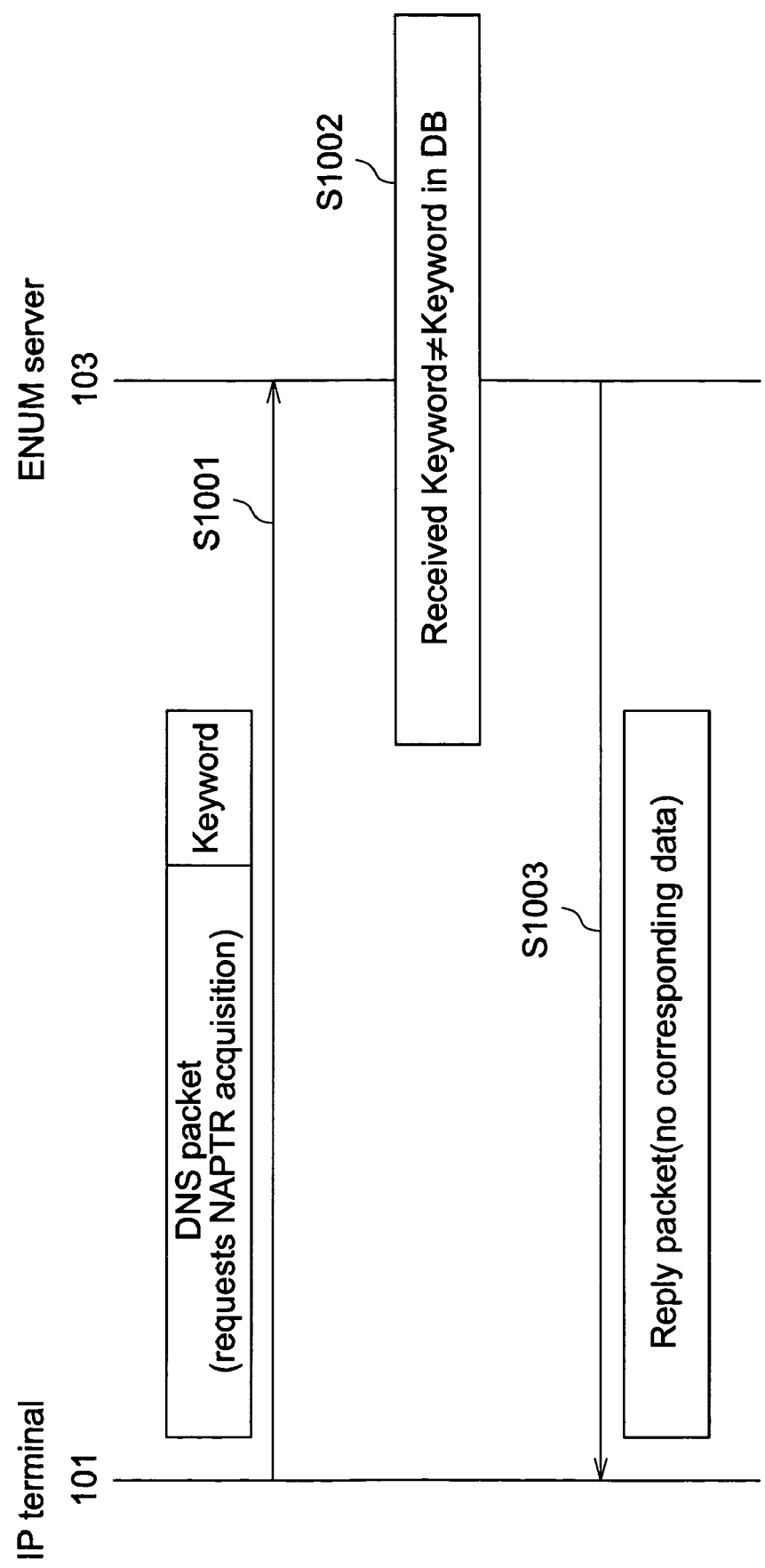
FIG. 10 illustrates a sequence diagram describing an operation when a keyword transmitted from the IP terminal apparatus to the ENUM server is not identical according to the first embodiment.

Next, a flow of specific operations is discussed regarding IP terminal 101 in FIG. 6 above and ENUM server 103 in FIG. 8 above, with reference to sequence diagrams shown in FIG. 9 and FIG. 10.

FIG. 9 is a sequence diagram illustrating operations when a keyword, included in a DNS packet transmitted from IP terminal 101 to ENUM server 103, is identical to a keyword of IP terminal 102 registered in the keyword database.

As shown in FIG. 9, IP terminal 101 generates destination NAPTR query data that include telephone number information of destination IP terminal 102, adds a keyword "ABC" (KeyWord in the diagram) of destination IP terminal 102 to the destination NAPTR query data, generates a DNS packet and transmits the DNS packet to ENUM server 103 (step S901).

When receiving the DNS packet from IP terminal 101, ENUM server 103 retrieves, from the NAPTR database, NAPTR records of destination IP terminal 102, based on the destination NAPTR query data included in the DNS packet, compares the keyword "ABC" included in the DNS packet with a keyword "ABC" registered in the "KeyWord" field of the keyword database and confirms that the keywords are identical (step S902).

Then ENUM server 103 generates a reply packet using the retrieved NAPTR records, excluding "KeyWord," and returns the reply packet to IP terminal 101 (step S903). FIG. 9 shows an example of a reply packet that includes "NAPTR 10 100 E2U+ifax (ifax@jp.dddd.com)" and "NAPTR 10 100 E2U+sip (mail@jp.dddd.com)." The data "NAPTR 10 100 E2U+ifax (ifax@jp.dddd.com)" and "NAPTR 10 100 E2U+sip (mail@jp.dddd.com)" are generated from two NAPTR records other than "KeyWord" of three NAPTR records of IP terminal 102 registered in the NAPTR database in FIG. 5.

In the operation discussed above, the reply packet returned from ENUM server 103 to IP terminal 101 has the NAPTR records without "KeyWord," which prevents a leak of the keyword to a third party even when the reply packet is captured and blocks an unauthorized access to IP terminal 102 using the keyword.

FIG. 10 is a sequence diagram illustrating an operation when a keyword, included in a DNS packet transmitted from IP terminal 101 to ENUM server 103, is not identical to a keyword of IP terminal 102 registered in the keyword database.

As shown in FIG. 10, IP terminal 101 generates destination NAPTR query data that include telephone number information of destination IP terminal 102, adds a keyword, for example, "BCD" of destination IP terminal 102 to the destination NAPTR query data, generates a DNS packet and transmits the DNS packet to ENUM server 103 (step S1001).

When receiving the DNS packet from IP terminal 101, ENUM server 103 retrieves, from the NAPTR database, NAPTR records of destination IP terminal 102, based on the destination NAPTR query data included in the DNS packet, compares the keyword "BCD" included in the DNS packet with a keyword "ABC" registered in the "KeyWord" field of the keyword database and confirms that the keywords are not identical (step S1002).

Then ENUM server 103 generates a reply packet including "No corresponding data" for destination IP terminal 102, since the keywords are not identical, and returns the reply packet to IP terminal 101 (step S1003).

In the operation discussed above, the reply packet that ENUM server 103 returns to IP terminal 101 includes "No corresponding data" alone, which prevents a leak of the NAPTR records of IP terminal 102 to a third party who attempts an unauthorized access.

As discussed above, in the IP communication system according to the first embodiment, keywords are communicated between IP terminals in advance. An IP terminal inputs a keyword when placing a call to a destination IP terminal and transmits a DNS packet that includes the keyword to the ENUM server. When the ENUM server receives the DNS packet, the ENUM server compares the keyword included in the DNS packet with a keyword of the destination IP terminal pre-registered in the keyword database. When the keywords are identical, the ENUM server generates a reply packet that includes the NAPTR records except the keyword and returns the reply packet to the originating IP terminal. When the keywords are not identical, the ENUM server generates a reply packet that includes "No corresponding data" and returns the reply packet to the originating IP terminal.

Therefore, even when a third party captures the DNS packet and the reply packet communicated between the IP terminal and the ENUM server, the keyword and NAPTR records of the destination IP terminal are not leaked at the same time, thus preventing a third party from improperly accessing the destination IP terminal using the keyword.

Moreover, when a third party accesses the ENUM server using a telephone number of the destination IP terminal alone, the party is unable to obtain the NAPTR records unless a corresponding keyword is input, thus preventing a leak of personal information of the destination IP terminal user.

The system consequently improves security against information leak from the ENUM server in an open environment as well as reliability of the IP communication system.

Second Embodiment

The second embodiment of the present invention adds other keyword (e.g., SIP address) of a destination IP terminal to a DNS packet, instead of using a keyword added to a DNS packet as described in the first embodiment above, eliminating presetting of a keyword.

Since configurations of IP communication 100, IP terminals 101 and 102 and ENUM server 103 according to the second embodiment are the same as described in FIGS. 1, 2 and 3 in the first embodiment, explanation on the figures and configurations is omitted.

Hard disk drive 304 in ENUM server 103 has a keyword database shown in FIG. 4 and a NAPTR database shown in FIG. 5.

A transmission operation of a DNS packet in IP communication system 100 of FIG. 1 is discussed with reference to a flowchart in FIG. 6. In IP communication system 100, IP terminal 101 transmits a DNS packet to ENUM server 103 for inquiring NAPTR records of destination IP terminal 102.

Steps S601 and S602 in FIG. 6 of the operation of IP terminal 101 are the same as those of IP terminal 101 in the first embodiment. Therefore, explanation on the steps is omitted, and step S603 and after are discussed.

CPU 201 of IP terminal 101 determines whether other keyword, such as a SIP address, is input from key input section 203 (step S603). When a SIP address "mail@jp.dddd.com" of IP terminal 102 is input (step S603: Yes), CPU 201 merges the SIP address "mail@jp.dddd.com" into destination NAPTR query data (step S604). On the other hand, when other keyword "mail@jp.dddd.com" of IP terminal 102 is not input (step S603: No), CPU 201 proceeds to step S605.

Then CPU 201 generates a DNS packet, based on one of the destination NAPTR query data merged with the SIP address "mail@jp.dddd.com" and the destination NAPTR query data alone (step S605). FIG. 11 shows an example of the DNS packet.

Then CPU 201 transmits the generated DNS packet from IP network controller 210 to ENUM server 103 through external I/F selector 209 (step S606) and completes the process.

Next, an operation of ENUM server 103 in IP communication system 100 is discussed with reference to a flowchart in FIG. 8. ENUM server 103 receives the DNS packet transmitted from IP terminal 101 and returns a reply packet.

As a premise to discuss the operation in FIG. 8, it is assumed that hard disk drive 304 in ENUM server 103 has the keyword database shown in FIG. 4 and the NAPTR database shown in FIG. 5.

Steps from S801 to S808 in FIG. 8 of the operation of ENUM server 103 are the same as those of ENUM server 103 in the first embodiment. Therefore, explanation on the steps is omitted, and step S809 and after are discussed.

When added data contained in the DNS packet received from IP terminal 101 is determined to be other data (SIP address "mail@jp.dddd.com") (step S809: Yes), CPU 301 in ENUM server 103 compares the added data (SIP address "mail@jp.dddd.com") with a SIP address "mail@jp.dddd.com" registered in the "Other KeyWord" field of the keyword database and determines whether the SIP addresses are identical (step S810).

When the added data (SIP address "mail@jp.dddd.com") is determined to be the same as the registered data (step S810: Yes), CPU 301 generates a reply packet using all NAPTR records of the destination IP terminal retrieved in step S802 (step S811), returns the generated reply packet to IP terminal 101 through IP network I/F 305 via IP network 106 (step S807) and then completes the process.

When no data is added to the DNS packet in step S803 (step S803: No), CPU 301 proceeds to step S812, generates a reply packet that includes "No corresponding data," returns the reply packet to IP terminal 101 and then completes the process.

Next, a flow of specific operations is discussed regarding IP terminal 101 in FIG. 6 above and ENUM server 103 in FIG. 8 above, with reference to sequence diagrams shown in FIG. 11 and FIG. 12.

FIG. 11 is a sequence diagram illustrating operations when a SIP address, included in a DNS packet transmitted from IP terminal 101 to ENUM server 103, is identical to a SIP address of IP terminal 102 registered in the keyword database.

As shown in FIG. 11, IP terminal 101 generates destination NAPTR query data that include telephone number information of destination IP terminal 102, adds a SIP address "mail@jp.dddd.com" of destination IP terminal 102 to the destination NAPTR query data, generates a DNS packet and transmits the DNS packet to ENUM server 103 (step S1101).

When receiving the DNS packet from IP terminal 101, ENUM server 103 retrieves, from the NAPTR database, NAPTR records of destination IP terminal 102, based on the destination NAPTR query data included in the DNS packet, compares the SIP address "mail@jp.dddd.com" included in the DNS packet with a SIP address "mail@jp.dddd.com" registered in the "Other KeyWord" field of the keyword database and confirms that the SIP addresses are identical (step S1102).

Then ENUM server 103 generates a reply packet using the retrieved NAPTR records, including the SIP address, and returns the reply packet to IP terminal 101 (step S1103). FIG. 11 shows an example of a reply packet that includes "NAPTR 10 100 E2U+ifax (mail@jp.dddd.com)" and "NAPTR 10 100 E2U+sip (ifax@jp.dddd.com)." The data "NAPTR 10 100 E2U+ifax (mail@jp.dddd.com)" and "NAPTR 10 100 E2U+sip (ifax@jp.dddd.com)" are generated from the SIP address and the fax address of IP terminal 102 registered in the NAPTR database in FIG. 5.

In the operation discussed above, the reply packet returned from ENUM server 103 to IP terminal 101 has the NAPTR records including the SIP address; therefore, the IP terminal 101 user is able to know a plurality of methods to access destination IP terminal 102 at one time.

Furthermore, even when a third party attempts to collect NAPTR records from the ENUM server using a plurality of telephone numbers, the party is unable to collect NAPTR records without adding a SIP address and other data, thereby preventing an unauthorized access to IP terminal 102 using a telephone number.

FIG. 12 is a sequence diagram illustrating an operation when an e-mail address, included in a DNS packet transmitted from IP terminal 101 to ENUM server 103, is not identical to an e-mail address of IP terminal 102 registered in the keyword database.

As shown in FIG. 12, IP terminal 101 generates destination NAPTR query data that include telephone number information of destination IP terminal 102, adds an e-mail address, for example, "mail@jp.abcd.com" of destination IP terminal 102 to the destination NAPTR query data, generates a DNS packet and transmits the DNS packet to ENUM server 103 (step S1201).

When receiving the DNS packet from IP terminal 101, ENUM server 103 retrieves, from the NAPTR database, NAPTR records of destination IP terminal 102, based on the destination NAPTR query data included in the DNS packet, compares the e-mail address "mail@jp.abcd.com" included in the DNS packet with a SIP address "mail@jp.dddd.com" registered in the "Other KeyWord" field of the keyword database and confirms that the addresses are not identical (step S1201).

Then ENUM server 103 generates a reply packet including "No corresponding data" for destination IP terminal 102, since the addresses are not identical, and returns the reply packet to IP terminal 101 (step S1203).

In the operation discussed above, the reply packet that ENUM server 103 returns to IP terminal 101 includes "No corresponding data" alone, which prevents a leak of the NAPTR records of IP terminal 102 to a third party who attempts an unauthorized access.

As discussed above, in the IP communication system according to the second embodiment, an IP terminal inputs a SIP address and other data when placing a call to a destination IP terminal and transmits a DNS packet having the SIP address to the ENUM server. When the ENUM server receives the DNS packet, the ENUM server compares the SIP address included in the DNS packet with a SIP address of the destination IP terminal pre-registered in the keyword database as other keyword. When the SIP addresses are identical, the ENUM server generates a reply packet that contains NAPTR records including the SIP address and returns the reply packet to the originating IP terminal. When the SIP addresses are not identical, the ENUM server generates a reply packet that includes "No corresponding data" and returns the reply packet to the originating IP terminal.

Therefore, even when a third party captures the DNS packet and the reply packet communicated between the IP terminals and the ENUM server, the telephone number and NAPTR records of the destination IP terminal are not leaked at the same time, thus preventing a third party from improperly accessing the destination IP terminal using the telephone number.

Moreover, when a third party accesses the ENUM server using the telephone number of the destination IP terminal alone, the party is unable to obtain the NAPTR records unless a corresponding SIP address is input, thus preventing a leak of personal information of the destination IP terminal user.

The system consequently improves security against information leak from the ENUM server in an open environment as well as reliability of the IP communication system.

Unlike the IP communication system according to the first embodiment, the IP communication system according to the second embodiment eliminates an effort to communicate a keyword between IP terminal users, thereby providing more convenience to users.

The embodiments discussed above show a case where IP terminal 101 places a call to IP terminal 102. The same process applies when IP terminal 102 places a call to IP terminal 101.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-296839 filed on Oct. 8, 2004, entire content of which is expressly incorporated by reference herein.

What is claimed is:

1. An IP communication method for an IP communication system, the IP communication system including an IP terminal apparatus and an ENUM (Telephone Number Mapping) server, the IP terminal apparatus being connected to the IP communication network via an IP network, the ENUM server including a database to store NAPTR (Naming Authority Pointer) resource records corresponding to telephone number information of a destination IP terminal apparatus and returning the NAPTR resource records in response to a query from the IP terminal apparatus, the IP communication method comprising:

storing, in a memory of the ENUM server, a keyword corresponding to the telephone number information of the destination IP terminal apparatus;

generating, at the IP terminal apparatus, a query packet by adding an input keyword to a packet for inquiring NAPTR resource records of the destination IP terminal apparatus;

transmitting, from the IP terminal apparatus to the ENUM server, the generated query packet;

receiving, at the ENUM server from the IP terminal apparatus, the query packet with the added keyword regarding the destination IP terminal apparatus;

comparing, at the ENUM server, the keyword included in the received query packet with the keyword of the destination IP terminal apparatus stored in the memory;

retrieving, from the database of the ENUM server, corresponding NAPTR resource records, when the keyword included in the query packet is identical to the keyword stored on the ENUM server;

generating, at the ENUM server, a reply packet that includes the NAPTR resource records;

transmitting, from the ENUM server, the generated reply packet to the IP terminal apparatus from which the query packet is received regarding the destination IP terminal apparatus;

receiving, at the IP terminal apparatus from the ENUM server, the reply packet that includes the NAPTR resource records of the destination IP terminal apparatus, when the keyword included in the query packet is identical to the keyword stored on the ENUM server;

receiving, at the IP terminal apparatus from the ENUM server, a reply packet indicating that no NAPTR resource record of the destination IP terminal apparatus is available when the keyword included in the query packet is not identical to the keyword stored on the ENUM server; and generating, at the ENUM server, a reply packet indicating that no NAPTR resource record of the destination IP terminal apparatus is available when the keyword included in the query packet is not identical to the keyword stored on the ENUM server.

2. The IP communication method according to claim 1, further comprising:

storing, in memory of the ENUM server, address information corresponding to telephone number information of the destination IP terminal apparatus;

adding, at the IP terminal apparatus, address information of the destination IP terminal apparatus to the query packet;

receiving, at the ENUM server from the IP terminal apparatus, a query packet of the destination IP terminal apparatus with the address information added;

comparing, at the ENUM server, the address information added to the received query packet with the address information of the destination IP terminal apparatus stored in the memory;

retrieving, from the database of the ENUM server, all corresponding NAPTR resource records, when the added address information is identical to the address information of the destination IP terminal apparatus stored in the memory;

generating, at the ENUM server, a reply packet that includes all NAPTR resource records; and receiving, at the IP terminal apparatus from the ENUM server, the reply packet that includes all NAPTR resource records of the destination IP terminal apparatus, when the address information is identical to address information stored on the ENUM server.

3. The IP communication method according to claim 2, further comprising receiving, at the IP terminal apparatus from the ENUM server, a reply packet indicating that no NAPTR resource record of the destination IP terminal apparatus is available, when the added address information is not identical to the address information of the destination IP terminal apparatus stored in the memory, and generating, at the ENUM server, a reply packet indicating that no NAPTR resource record of the destination IP terminal apparatus is available, when the added address information is not identical to the address information of the destination IP terminal apparatus stored in the memory.

4. An IP terminal apparatus connected to an ENUM (Telephone Number Mapping) server via an IP network, the IP terminal apparatus comprising:
   a generator that adds an input keyword to a packet for inquiring NAPTR (Naming Authority Pointer) resource records of a destination IP terminal apparatus to generate a query packet;
   a transmitter that transmits the generated query packet to the ENUM server; and
   a receiver that receives, from the ENUM server, a reply packet including the NAPTR resource records of the destination IP terminal apparatus, when the keyword included in the query packet is identical to a keyword stored on the ENUM server, wherein, when the keyword included in the query packet is not identical to the keyword stored on the ENUM server, the receiver receives, from the ENUM server, a reply packet indicating that no NAPTR resource record of the destination IP terminal apparatus is available.

5. The IP terminal apparatus according to claim 4, wherein the generator adds address information of the destination IP terminal apparatus to the query packet and, when the address information included in the query packet is identical to address information stored on the ENUM server, the receiver receives, from the ENUM server, a reply packet that includes all NAPTR resource records of the destination IP terminal apparatus.

6. The IP terminal apparatus according to claim 5, wherein, when the address information included in the query packet is not identical to the address information stored on the ENUM server, the receiver receives, from the ENUM server, a reply packet indicating that no NAPTR resource record of the destination IP terminal apparatus is available.

7. An ENUM (Telephone Number Mapping) server having a database to store registered NAPTR (Naming Authority Pointer) resource records corresponding to telephone number information of an IP terminal apparatus and returning the NAPTR resource records in response to a query from an IP terminal apparatus, the ENUM server comprising:
   a memory that stores a keyword corresponding to telephone number information of a destination IP terminal apparatus;
   a receiver that receives, from the IP terminal apparatus, the query packet with the added keyword regarding the destination IP terminal apparatus;
   a comparer that compares the keyword added to the received query packet with the keyword of the destination IP terminal apparatus stored in the memory;
   a retriever that retrieves, from the database, corresponding NAPTR resource records, when the added keyword is identical to the keyword stored in the memory;
   a generator that generates a reply packet including the NAPTR resource records; and
   a transmitter that transmits the generated reply packet to the IP terminal apparatus from which the query packet is received regarding the destination IP terminal apparatus, wherein a reply packet is received at the IP terminal apparatus from the ENUM server that indicates that no NAPTR resource record of the destination IP terminal apparatus is available when the keyword included in the query packet is not identical to the keyword stored on the ENUM server, the ENUM server generating a reply packet that indicates that no NAPTR resource record of the destination IP terminal apparatus is available when the keyword included in the query packet is not identical to the keyword stored on the ENUM server.

8. An IP communication system, comprising:
an IP terminal apparatus that is connected to the IP communication system via an IP network; and
an ENUM (Telephone Number Mapping) server that has a database to store registered NAPTR (Naming Authority Pointer) resource records corresponding to telephone number information of an IP terminal apparatus and that returns the NAPTR resource records in response to a query from an IP terminal apparatus,
the IP terminal apparatus further comprising:
a generator that generates a query packet that adds an input keyword to a packet for inquiring NAPTR resource records of a destination IP terminal apparatus;
a transmitter of the generated query packet to the ENUM server; and
a receiver that receives a reply packet that includes the NAPTR resource records of the destination IP terminal apparatus from the ENUM server, when the keyword included in the query packet is identical to a keyword stored on the ENUM server,
the ENUM server further comprising:
a memory that stores the keyword corresponding to the telephone number information of the destination IP terminal apparatus;
a receiver that receives, from the IP terminal apparatus, the query packet with the added keyword regarding the destination IP terminal apparatus;
a comparer that compares the keyword added to the received query packet with the keyword of the destination IP terminal apparatus stored in the memory;
a retriever that retrieves corresponding NAPTR resource records from the database, when the added keyword is identical to the keyword of the destination IP terminal apparatus stored in the memory;
a generator that generates a reply packet including the NAPTR resource records; and
a transmitter that transmits the generated reply packet to the IP terminal apparatus from which the query packet is received regarding the destination IP terminal apparatus, wherein a reply packet is received at the IP terminal apparatus from the ENUM server that indicates that no NAPTR resource record of the destination IP terminal apparatus is available when the keyword included in the query packet is not identical to the keyword stored on the ENUM server, the ENUM server generating a reply packet that indicates that no NAPTR resource record of the destination IP terminal apparatus is available when the keyword included in the query packet is not identical to the keyword stored on the ENUM server.

* * * * *